United States Patent [19]
Koblitz

[11] Patent Number: 4,595,724
[45] Date of Patent: Jun. 17, 1986

[54] FLAME RETARDANT SEALANT
[75] Inventor: Francis F. Koblitz, York, Pa.
[73] Assignee: AMP Incorporated, Harrisburg, Pa.
[21] Appl. No.: 763,076
[22] Filed: Aug. 5, 1985

Related U.S. Application Data

[63] Continuation-in-part of Ser. No. 573,526, Jan. 24, 1984, abandoned.

[51] Int. Cl.$^4$ .......................... C08K 3/22; C08L 27/16
[52] U.S. Cl. .................................. 524/409; 529/432;
529/520; 525/199; 525/209; 174/74 A; 174/77 R; 174/84 R
[58] Field of Search ................. 174/84 R, 77 R, 74 R; 260/DIG. 24; 524/409, 432, 520; 525/199, 209

[56] References Cited

U.S. PATENT DOCUMENTS

| Re. 31,103 | 12/1982 | Gotcher et al. | 428/35 |
| 3,243,211 | 3/1966 | Wetmore | 287/78 |
| 3,253,060 | 5/1966 | Koblitz et al. | 525/199 |
| 3,312,772 | 4/1967 | Sherlock | 174/75 |
| 3,396,460 | 8/1968 | Wetmore | 29/629 |
| 3,455,337 | 7/1969 | Cook | 138/178 |
| 3,525,799 | 5/1970 | Ellis | 174/84 R |
| 3,708,611 | 1/1973 | Dinger | 174/84 |
| 3,763,222 | 10/1973 | Aronoff et al. | |
| 3,840,619 | 10/1974 | Aronoff et al. | 260/878 R |
| 3,894,118 | 7/1975 | Aronoff et al. | 260/884 |
| 3,911,192 | 10/1975 | Aronoff et al. | 428/379 |
| 3,945,974 | 3/1976 | Schwarcz et al. | 524/432 |
| 3,970,770 | 7/1976 | Dhami | 428/379 |
| 3,985,716 | 10/1976 | Dhami | 526/18 |
| 3,995,091 | 11/1976 | Dhami | 428/379 |
| 4,197,380 | 4/1980 | Chao et al. | 525/199 |
| 4,251,304 | 2/1981 | Campbell et al. | 156/85 |
| 4,342,800 | 8/1982 | Changani et al. | 428/36 |
| 4,353,961 | 10/1982 | Gotcher et al. | 428/380 |
| 4,366,201 | 12/1982 | Changani et al. | 428/157 |

FOREIGN PATENT DOCUMENTS 1049089 11/1966 United Kingdom .

OTHER PUBLICATIONS

Paul et al., "Polymer Blends", Academic Press, New York, vol. 1, 7/18/79-pp. 1-14, 83, 85, 86, 112.

Primary Examiner—John Kight
Assistant Examiner—Kriellion Morgan
Attorney, Agent, or Firm—Katherine A. Nelson

[57] ABSTRACT

A fusible flame retardant sealant composition comprised of a homogeneous mixture of polyvinylidene fluoride, methacrylate polymer, and antimony oxide is disclosed. In the preferred embodiment, the sealant composition also contains zinc oxide. The sealant composition as disclosed herein is used to make fusible sealant inserts for preinsulated electrical connectors having a heat recoverable sleeve. The connectors are essentially comprising a conductor connecting means positioned within the heat recoverable sleeve, the conductor connecting means being designed to receive and electrically connect two or more electrical conducting members, the members being inserted from the ends of the sleeve, and one fusible sealant insert member made of said composition positioned near each one of the open ends of the sleeve. Upon application of sufficient heat to the sleeve, the sleeve recovers around the conductor connecting means and the electrical conducting members, and the fusible sealant insert members soften, conform and adapt to the conducting member, adhere to the conducting member and the sleeve, and seal the interstices between the conducting member and the recovered sleeve. The resulting seal is flame retardant and resistant to corrosive chemicals such as jet fuel and lubricant.

25 Claims, 8 Drawing Figures

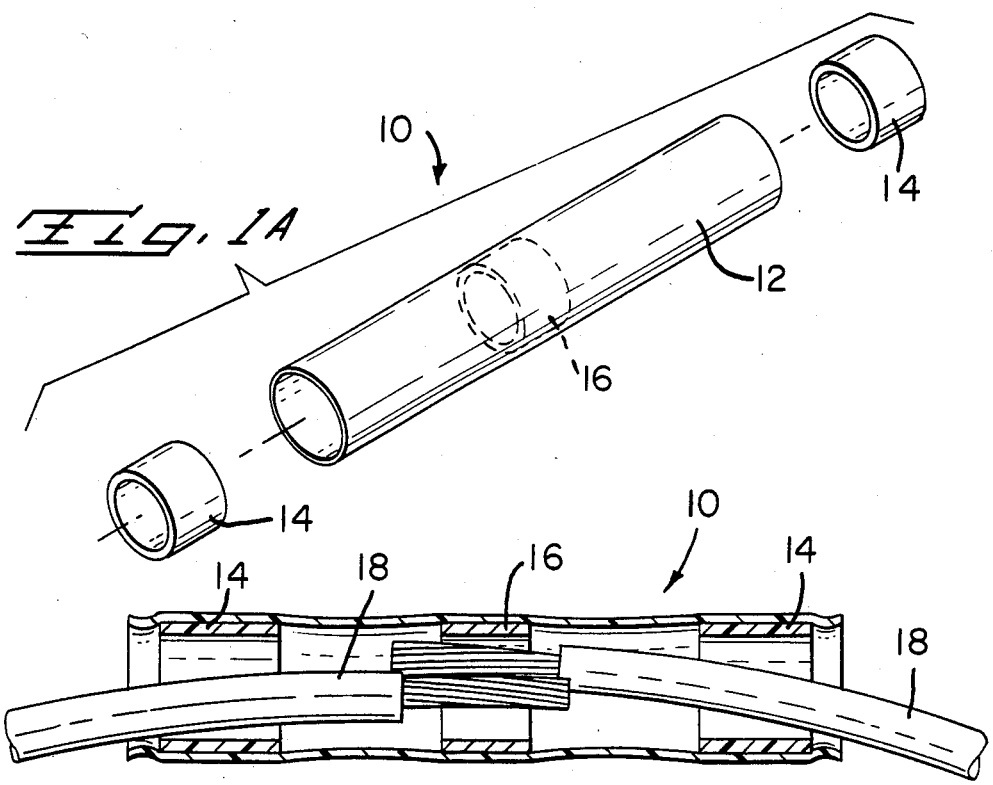
Fig. 1A
Fig. 1B
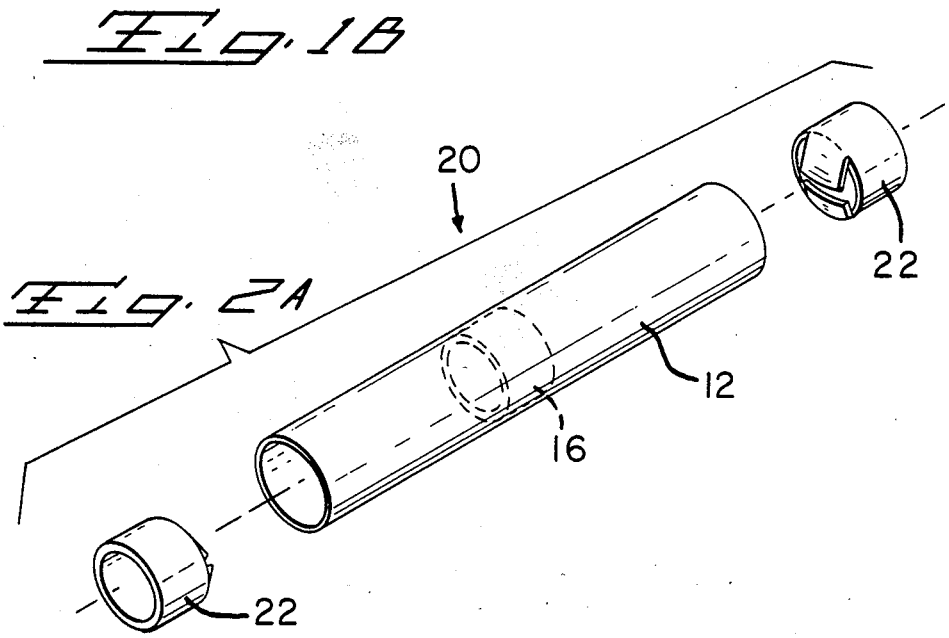
Fig. 2A

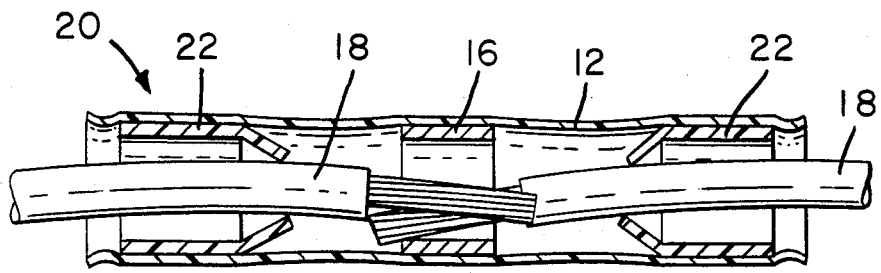
_Fig. 2B_
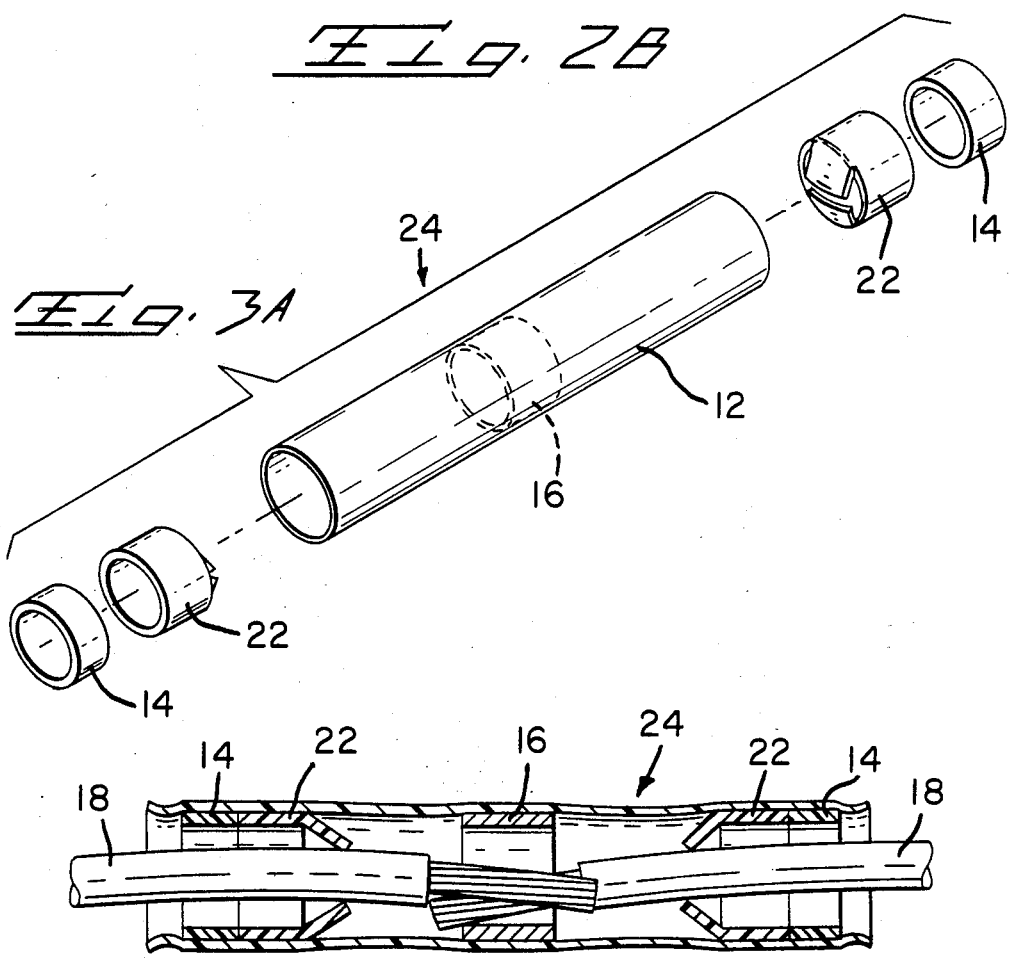
_Fig. 3A_
_Fig. 3B_

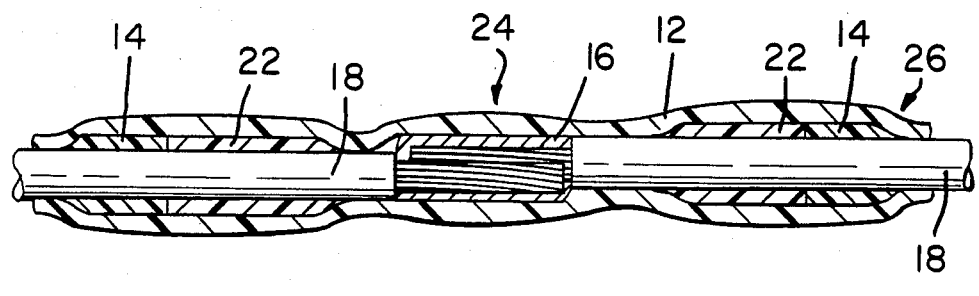
_Fig. 3C_
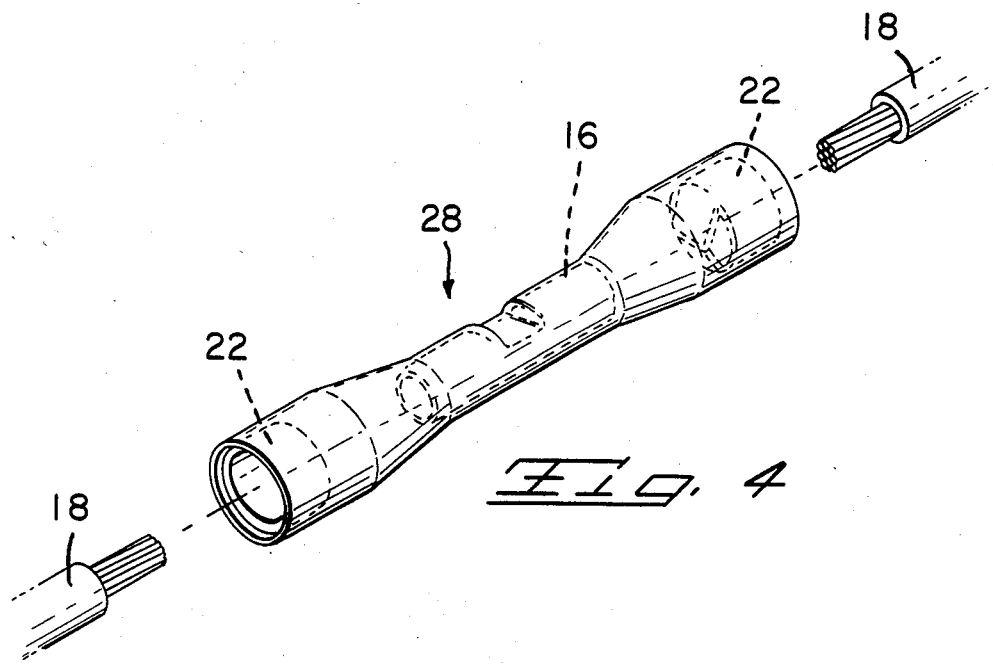
_Fig. 4_

FLAME RETARDANT SEALANT

This application is a continuation-in-part of application Ser. No. 573,526 filed Jan. 24, 1984 now abandoned.

FIELD OF THE INVENTION

This invention relates to sealants used with preinsulated electrical connectors and more particularly with connectors that are sealably covered with a heat recoverable sleeve.

BACKGROUND OF THE INVENTION

Preinsulated electrical connectors having recoverable sleeves are commonly used for splicing and terminating electrical wires. The connector is comprised of a wire connecting means, such as a solder ring or crimpable wire barrel positioned inside of a heat recoverable sleeve. Electrical connection is effected by inserting the stripped ends of the wire into the wire connecting means and fusing the solder ring or crimping the barrel around the wire. The ends of such a sleeve generally extend beyond the wire connecting means and over the insulated portion of the wire. Upon applying a sufficient amount of heat to the sleeve, the sleeve recovers radially in an encircling relationship around the wire connecting means and around the wire which extends from the ends of the sleeve.

In order to ensure a better seal between the end of the sleeve and the wire which extends from the sleeve, fusible inserts are positioned inside the ends of the sleeve which are to receive wires. As the sleeve is heated, the fusible inserts soften and conform closely to the wire, thus sealing the gaps between the sleeve and the insulation on the wire. U.S. Pat. Nos. 3,243,211; 3,312,772; 3,396,460; and 3,708,611 disclose splice connectors which use insert rings to increase the seal between the sleeve and the wire. The inserts of the instant invention are distinguished from those of the prior art by being fusible yet not truly liquid when melted. This precludes their being extruded from their desired location during the establishment of the connection and sealing thereof. In explanation, the sealants of this invention have a melt viscosity of 3,000 to 11,000 poises at 400°–450° F. (204°–232° C.). This is 300,000 to 1,100,000 times the viscosity of water. In short, instead of behaving as a fluid, the molten sealants resemble sticky gums which are readily deformable and conform and adapt to the local topography of the wire jacket surface.

In recent years there has been an increased demand, particularly in the aircraft industry, for preinsulated connectors that remain stable even when the connectors are subjected to high operating temperatures, 356°–374° F. (180°–190° C.). In addition, the connectors must be environmentally sealed and impervious to corrosive chemicals such as jet fuel and lubricants. For many applications, the connectors must also be flame retardant.

Sealing materials known in the art, such as polyolefins, polyamides and polyesters, are generally not satisfactory under the above described conditions. Many of these materials have melting points that are lower than the operating temperature of the equipment in which the connectors are used. The sealant, therefore, flows from the ends of the recovered sleeve and exposes the wire connecting means to environmental attack. Others of these known sealants are attacked by the corrosive chemicals and deteriorate, thus exposing the spliced wires. Furthermore, wires used in high temperature applications generally are insulated with tetrafluoroethylene. Sealants such as those listed above do not adhere well to this insulation. Additionally, these sealants are not sufficiently flame retardant.

Use of the sealant composition as disclosed herein eliminates the aforementioned problems. The sealant is both stable at elevated temperatures and essentially chemically inert to common solvents, jet fuels, and lubricants. It also adheres to wires having tetrafluoroethylene insulation. Furthermore, it is flame retardant.

The sealant is a homogeneous mixture comprised of about 64% to about 93% by weight of polyvinylidene fluoride (hereinafter referred to as PVDF), about 3% to about 32% by weight of a methalcrylate polymer and approximately 4% antimony oxide. In the preferred embodiment, approximately 4% zinc oxide is added to the mixture to increase the stability of the sealant mixture during the manufacturing processes.

Fusible sealant inserts are made by cutting sections from a tube extruded from the mixture, the outside diameter of the tube being dimensioned to fit inside the heat recoverable sleeve.

The use of the sealed inserts can be understood by referring to the following drawings.

DESCRIPTION OF THE DRAWINGS

FIG. 1A is an isometric view of a splice connector with the rings of sealant exploded out of the sleeve and a solder ring in phantom within the sleeve.

FIG. 1B is a cross section of the assembled splice connector of FIG. 1A showing the solder ring, the sealant inserts and wires within the sleeve prior to heating.

FIG. 2A is an isometric view similar to 1A showing an alternative embodiment of the sealing rings.

FIG. 2B is a cross sectional view similar to 1B showing the alternative embodiment of the sealing rings of FIG. 2A.

FIG. 3A is an isometric view similar to 1A showing an alternative embodiment of the connector.

FIG. 3B is a cross sectional view showing the alternative embodiment of the connector of FIG. 3A.

FIG. 3C is a cross sectional view of the connector of 3A after the application of heat to the sleeve.

FIG. 4 is an isometric view of an alternative embodiment of a splice connector having a crimpable wire barrel.

PREFERRED EMBODIMENT

FIGS. 1A and 1B show a typical splice connector 10 having a heat recoverable sleeve 12 and sealant inserts 14 and a wire connecting means 16. In this embodiment, the wire connecting means 16 is a solder ring. Wires 18 are inserted into the sleeve from both ends until the stripped ends of the wires 18 overlap within the wire connecting means 16.

FIGS. 2A and 2B show an alternative embodiment 20, a splice connector having a heat recoverable sleeve 12, sealant inserts 22, and wire connecting means 16. In this alternative embodiment 20 the sealant inserts 22 also act as wire retaining means. The use of the wire retaining inserts is disclosed in copending patent application Ser. No. 514,057, filed on July 15, 1983.

FIGS. 3A, 3B and 3C illustrate a further embodiment 24 of a splice connector having a heat recoverable sleeve 12 and a wire connecting means 16. The retaining rings 22 in this embodiment may be made from material other than the sealant composition of this invention. In this embodiment, sealant inserts 14 in accordance with the invention are used in conjunction with the wire retaining means 22.

FIG. 3C illustrates the splice connector 24 after heat has been applied. The wire connecting means 16 has fused the wires together, and the sealant means 14 has flowed to fill the interstices between the recovered sleeve 12 and the wires 18. The sleeve has recovered to fit securely around the wire connecting means and the sealant inserts.

FIG. 4 shows another alternative embodiment 28 of a splice connector in which the wire connecting means 16 is a crimpable barrel.

In the preferred embodiment of the splice connector, the outer heat recoverable sleeve is made from radiation cross-linked PVDF, available as KYNAR grade 460, from Pennwalt Chemicals Corporation, Philadelphia, Pa. It is extruded into sleeve form, and it is subsequently expanded to the required diameter after being radiation crosslinked by techniques commonly used in the art. Other heat recoverable materials may be used to fabricate the sleeves and are limited only by the requirement for being both semicrystalline and crosslinkable for heat recoverability. The art on crosslinkable materials and crosslinking agents is illustrated but not limited to that disclosed in U.S. Pat. Nos. RE 31,103; 3,970,770; 3,985,716; 3,911,192; 3,894,118; 3,840,619; 3,763,222; 3,995,091; 4,366,201; 4,353,961; 4,342,800; 3,243,211; 3,396,460; 4,251,304; and 3,455,337.

The sealant, in the preferred embodiment, is compounded from a high crystalline melting point grade of PVDF, KYNAR grade 720, available from Pennwalt Chemicals Corporation. The methacrylate polymer used in the preferred embodiment is available from Rohm and Haas Corporation, Philadelphia, Pa., under the trade name Acryloid B-44 (abbreviated B-44). Although its composition is complex, it is believed to be principally methylmethacrylate-co-ethylacrylate with a molar ratio of approximately 60 to 40.

Other methacrylate polymers may also be used. The polymer should have the ability to adhere strongly to substances used in the high service temperature electrical insulation, archetypically fluoropolymers such as polytetrafluoroethylene. It also should have good miscibility with the PVDF in molten and solid mixtures. In addition to other criteria the methacrylate polymer should be one that produces a sealant with a melt viscosity of 3,000–1,000 poises when measured at 400°–450° F. (204°–232° C.) and has a weight average molecular weight in the range of 20,000 to 350,000 as determined by gel permeation chromatography. Certain low molecular weight methylmethacrylate homopolymers and copolymers with butylmethacrylate meet these criteria, especially those polymers which contain adhesion promoting comonomers typified by acrylic acid and methacrylate acid.

In the preferred embodiment, approximately 4% by weight antimony oxide powder was added to the above components. The addition of the antimony oxide increased the flame retardance of the compound from a requirement of an atmosphere containing 23% oxygen to support sustained combustion to a requirement of 30%. It is believed that this is a critical improvement in the electrical safety performance of the compound in electrical connectors and that it is a manifestation of a synergistic chemical interaction of the components resembling the compounds taught in U.S. Pat. No. 3,582,578, but with the contradictory difference that no special dehydrofluorinating catalyst is required.

Furthermore, the antimony oxide content of the sealant is believed to enhance the bonding of the connector to the jackets of the conductors. Whether this is a manifestation of stiffening the sealant to increase resistance to wire pullout, or whether it is an interaction with the fluoropolymer insulation on the wire has not been determined, but these are possible mechanisms.

In the preferred embodiment, approximately 4% zinc oxide was added to the components. Zinc oxide is used to assist in preventing degradation of the PVDF by the antimony oxide during the molding process when the temperature may reach 450° to 500° F. (232°–260° C.). In addition, the zinc oxide assists in preventing discoloration of the mixture by the antimony oxide.

It is known in the art that oxides of metals in groups IV and V of the Periodic Table of the Elements, such as antimony and titanium oxides may cause rapid dehydrohalogenation of compounds such as PVDF at high temperatures, particularly at temperatures needed for molding the material. As is disclosed in British Pat. No. 1,049,089, the addition of the methacrylate polymer to PVDF reduces the temperature required for molding, thereby alleviating the problems associated with dehydrohalogenation. More recent literature, D. R. Paul and Seymour Newman, *Polymer Blends*; Volume 1, pages 10, 83, 85–6; (New York: Academic Press, 1978), suggests a strong interaction of PVDF with methacrylate polymers. This may stabilize the compositions of the instant invention against the dehydrofluorinating effect of antimony oxides or exert a scavenging effect toward free hydrogen fluoride to prevent its discoloring action on the sealants. British Pat. No. 1,049,089 also shows, in its example 4, the use of zinc oxide in the presence of a degradative agent, titanium dioxide, but apparently does not recognize or claim the stabilizing effect of the zinc oxide. If desired, pigments or other colorants can be added to the mixture.

Those skilled in the art will recognize the advantages of the composition of this invention in other uses related to the primary use contemplated, viz. electrical connectors. For example, the lower melt viscosity of the sealants of this invention facilitates the extrusion and molding of articles as disclosed in U.S. Pat. No. 3,253,060, which previously lacked the attributes of flame retardance and higher service temperatures. The sealants of this invention have nearly 20° F. (11° C.) higher service operating temperatures and markedly greater resistance to burning than the molding compositions of U.S. Pat. No. 3,253,060.

Thus, the sealant compositions of this invention may be used in any of the processing operations commonly employed in fabricating articles from thermoplastic resins. The sealants are commonly extruded in tubular form with the desired diameter and subsequently cut to the desired length. So, any other extruded forms of tubing, rods, filaments, or profiles can readily be extruded to obtain high service temperature, flame retardant articles. Indeed, as taught in U.S. Pat. No. 3,253,060, the processes of extrusion and molding of articles with complex shapes are facilitated by the lower melt viscosity of the compositions of this invention, as opposed to the hgher melt viscosities of PVDF and other fluoropolymers.

To ensure homogeneity, the components are mixed, preferably in a compounding extruder such as a Werner-Pfleiderer ZSK 30 twin screw extruder, then extruded and pelletized by the methods common in the art into pellets approximately one-eighth inch by one-sixteenth inch (125×63 mm). The pellets are then extruded into a tube using a two and one-half inch diameter Prodex extruder. The diameter of the tube is dimensioned to fit snugly inside the heat recoverable outer sleeve. Sections are cut from the tube to form the inserts.

The resulting sealant has a low melt viscosity but a high melting point. Upon application of sufficient heat, the insert adapts to fill the interstices of the insulation around the wires and adheres to both the wires and the outer sleeve. If more than one wire is inserted from the same end of the sleeve, the sealant will adapt to fill interstices between wires, even when the wires have different diameters. The sealant adheres particularly well to wire insulations made of tetrafluoroethylene. The resulting seal is resistant to jet fuels and lubricants. The seal is not affected even when subjected to service temperatures of 356°–374° F. (180°–190° C.).

It is to be understood that splice connectors are used as representative samples only. The herein disclosed sealant may be used for various electrical conducting means such as leads from terminal posts, pin contact terminals, resistors, transistors, and the like.

The following examples illustrate the invention. They are not to be construed as limitations on the instant invention except as indicated in the appended claims. All compositions are expressed as parts by weight except where specifically indicated otherwise.

EXAMPLE 1

PVDF (41 pounds), KYNAR grade 720, Pennwalt Chemicals Corporation, was tumble blended in a Patterson-Kelley twin shell blender for thirty minutes with a methylmethacrylate-co-ethylacrylate polymer (11 pounds), Acryloid B-44, Rohm and Haas Corporation, designated as blend (A). Similar blends with the same proportions of ingredients were made substituting for the B-44; (B) a methylmethacrylate-butadiene-styrene impact modifier, Acryloid KM-653, Rohm and Haas Corp.; (C) a methylmethacrylate polymer extrusion aid, Acryloid K-120N, Rohm and Haas Corp.; (D) a methylmethacrylate-co-butylmethacrylate polymer, Elvacite 2013, E. I. DuPont de Nemours and Company, Wilmington, Del.; and (E) a methylmethacrylate-co-butylmethacrylate polymer, Acryloid B-66, Rohm and Haas Corp.

Each blend was individually extruded through a Werner-Pfleiderer ZSK 30 twin screw compounding extruder. Conditions were: screw rpms-300, kilowatts power 3.7-4, percent torque 50-60-70 (min-ave-max). Melt temperatures were: (A) 244° C., (B) 238° C., (C) 247° C., (D) 245° C., (E) 244° C. All the blends were extruded in twin strands and pelletized with a Cumberland pelletizer.

Each blend was compression molded at 400° F. (204° C.) into 0.030" thick sheets in a chrome-plated brass mold. Visual and tactile observations indicated that blend (A) yielded the most adhesive and most compatible (optically clear) sheet.

EXAMPLE 2

By the procedure of Example 1, 10-pound pelletized lots of six blends (extrusion compounds) were prepared. These were: (A) 97 parts by weight PVDF, KYNAR grade 720, to 3 parts by weight methylmethacrylate-co-ethylacrylate, Acryloid B-44; (B) 82 parts KYNAR 720, to 18 parts Acryloid B-44; (C) 70 parts KYNAR 720, to 30 parts Acryloid B-44; (D) 74 parts KYNAR 720, 18 parts Acryloid B-44, 4 parts antimony oxide, and 4 parts zinc oxide; (E) 89 parts KYNAR 720, 3 parts Acryloid B-44, 4 parts antimony oxide, and 4 parts zinc oxide; and (F) 64 parts KYNAR 720, 28 parts Acryloid B-44, 4 parts antimony oxide and 4 parts zinc oxide.

The melt viscosities of each blend were determined at 400° F. (204° C.) and 450° F. (232° C.), using an Instron melt rheometer at a shear rate of 1/second. Melt viscosities (in poises) observed at 400° F. (204° C.) (average of three determinations) were: (A) 10,500; (B) 10,000; (C) 7,900; (D) 9,600; (E) 11,400; and (F) 8,300. Melt viscosities (in poises) observed at 450° F. (232° C.) (average of three determinations) were: (A) 7,500; (B) 6,400; (C) 4,400; (D) 6,100; (E) 7,700; and (F) 5,000.

The optimum blend in terms of melt viscosity without a flame retardant pigment system was judged to be blend (C), and with a flame retardant, blend (F). However, at both temperatures the samples (B) and (D), with an Acryloid B-44 content of 18 parts by weight, exhibited a markedly improved melt viscosity over the minimum 3 parts by weight Acryloid B-44 compositions.

Subsequent flame retardance tests by American Society for Testing Materials method D-2863 indicated that films (0.005 to 0.010 inches thick) of KYNAR 720 had a limiting oxygen index of 33 (percent of oxygen in atmosphere to support combustion), blend (B) of 22, and blend (D) of 30 (essentially self-extinguishing). Thus, blend (D) was judged to have a favorable compromise of adhesion, adaptation, and flame retardance qualities.

EXAMPLE 3

The composition of Example 2, blend (D) was recompounded in a 40-pound lot and pelletized as described in example 1.

The two-and-one-half inch Prodex extruder previously described was fitted with a tubing die and sizing fixture. The die had an insider diameter of 0.152 inches and a core pin of 0.114 inches diameter. The sizing fixture had an inside diameter of 0.168 inches. Using zone temperatures of 465°–490° F. (241°–254° C.) in the extruder, the composition of blend (D) was extruded, in comparison to KYNAR grade 720 which required an average of 10° F. (6° C.) higher in all zones, including the tubing die.

Using 2 psi air pressure in the sizing die, tubing was extruded from both materials to an inside diameter of 0.11 to 0.13 inches, a wall thickness of 0.021-0.025 inches, and an outside diameter of nominally 0.15 inches. Blend (D) ran at a screw speed of 15 rpm compared to 4 rpm for KYNAR 720, and the blend (D) tubing had a smooth, glossy, ripple-free surface compared to a matte, occasionally rippled surface for KYNAR 720.

EXAMPLE 4

One-piece crimpable, environmentally sealable splice connectors were tested having sealant inserts made in accordance with the invention, using a composition of 74% PVDF KYNAR 720, 18% Acryloid B-44, 4% antimony oxide, and 4% zinc oxide, by weight. These connectors were compared with similar connectors having sealant inserts made of KYNAR 460 and KYNAR 720.

The connectors were 1.5 inches (3.8 cm) long and designed to accept from AWG 20 to AWG 16 wire.

AWG 20 tetrafluoroethylene-insulated wire was used for all samples. The sealant inserts were 0.400 inches (1.0 cm) long.

The wires were inserted into the connectors and crimped. Heat from a hot air source in excess of 600° F. (316° C.) was applied for approximately one minute to reduce the tubing. The sealed connectors were subjected to tests in accordance with Environmental Test Conditions Group V, MIL-STD 81824. All of the connectors having the sealant inserts made in accordance with the invention passed the specification. A number of the connectors having sealants made of KYNAR 460 and KYNAR 720 failed the test.

The same size connectors were also tested using 0.25" (0.64 cm)-long sealant inserts made in accordance with the invention. These connectors were also tested in accordance with Environmental Test Conditions Group V, MIL-STD 83519. All of these connectors passed this specification.

It is thought that the sealant composition of the present invention and many of its attendant advantages will be understood from the foregoing description and examples. It will be apparent that various changes may be made in the percentage composition of the components and the composition of the methacrylate polymer used, without departing from the spirit or scope of the invention or sacrificing all its material advantages. The sealant composition may be used in various types of connectors having heat recoverable sleeves. The form herein described is merely a preferred or exemplary embodiment thereof.

What is claimed is:

1. A fusible sealant composition for use with preinsulated electrical connectors having a heat recoverable sleeve, the connectors essentially comprising a conductor connecting means positioned within the heat recoverable sleeve, the conductor connecting means being designed to receive and electrically connect two or more electrical conducting members, the members being inserted from the ends of the sleeve, and at least one fusible sealant insert member made of said composition positioned near at least one of the open ends of the sleeve, the composition being characterized in that:
    the sealant is a homogeneous mixture comprised of polyvinylidene fluoride, a methacrylate polymer, and antimony oxide,
    the polyvinylidene fluoride comprises from about 64 percent to about 93 percent by weight of the mixture,
    the methacrylate polymer comprises from about 3 percent to about 32 percent by weight of the mixture,
    the antimony oxide comprises approximately 4 percent by weight of the mixture whereby,
upon application of sufficient heat to the sleeve, the sleeve recovers around the conductor connecting means and the electrical conducting members, and said at least one fusible sealant insert member softens, conforms and adapts to an associated said conducting member, adheres to the conducting member and the sleeve, and seals the interstices between the conducting member and the recovered sleeve.

2. The fusible sealant composition as set forth in claim 1, further characterized in that the composition is also comprised of approximately 4 percent by weight of zinc oxide.

3. The fusible sealant composition as set forth in claim 1, further characterized in that the methacrylate polymer is one that is miscible with polyvinylidene fluoride and produces a sealant with a melt viscosity of 3,000 to 11,000 poises when measured at 400°-450° F. (204°-232° C.).

4. The fusible sealant composition as set forth in claim 1, further characterized in that the methacrylate polymer is methylmethacrylate-co-ethylacrylate.

5. The fusible sealant composition as set forth in claim 1, further characterized in that the methacrylate polymer is methylmethacrylate-co-butylmethacrylate.

6. The fusible sealant composition as set forth in claim 2, further characterized in that the methacrylate polymer is one that is miscible with polyvinylidene fluoride and produces a sealant with a melt viscosity of 3,000 to 1,000 poises when measured at 400°-450° F. (204°-232° C.).

7. The fusible sealant composition as set forth in claim 2, further characterized in that the methacrylate polymer is methylmethacrylate-co-ethylacrylate.

8. The fusible sealant composition as set forth in claim 2, further characterized in that the methacrylate polymer is methylmethacrylate-co-butylmethacrylate.

9. A fusible sealant composition for use with preinsulated electrical connectors having a heat recoverable sleeve, the connectors essentially comprising a wire connecting means positioned within the heat recoverable sleeve, the wire connecting means being designed to receive and electrically connect two or more wires, said wires being inserted from the open ends of the sleeve and into the wire connecting means, and one fusible sealant insert member made of said composition positioned near each open end of the sleeve, the composition being characterized in that:
    the sealant is a homogeneous mixture comprised of polyvinylidene fluoride, a methacrylate polymer, and antimony oxide,
    the polyvinylidene fluoride comprises from 64 percent to about 93 percent by weight of the mixture,
    the methacrylate polymer comprises from about 3 percent to about 32 percent by weight of the mixture,
    the antimony oxide comprises approximately 4 percent by weight of the mixture whereby,
upon application of sufficient heat to the sleeve, the sleeve recovers around the wire connecting means and said wires and said fusible sealant insert members soften, conform and adapt to the wire, adhere to the wire and sleeve, and seal the interstices between the wire and the recovered sleeve.

10. The fusible sealant composition as set forth in claim 9, further characterized in that the composition is also comprised of approximately 4 percent by weight of zinc oxide.

11. The fusible sealant composition as set forth in claim 9, further characterized in that the methacrylate polymer is one that is miscible with polyvinylidene fluoride and produces a sealant with a melt viscosity of 3,000 to 11,000 poises when measured at 400°-450° F. (204°-232° C.).

12. The fusible sealant composition as set forth in claim 9, further characterized in that the methacrylate polymer is methylmethacrylate-co-ethylacrylate.

13. The fusible sealant composition as set forth in claim 9, further characterized in that the methacrylate polymer is methylmethacrylate-co-butylmethacrylate.

14. The fusible sealant composition as set forth in claim 10, further characterized in that the methacrylate polymer is one that is miscible with polyvinylidene fluoride and produces a sealant with a melt viscosity of 3,000 to 11,000 poises when measured at 400°–450° F. (204°–232° C.).

15. The fusible sealant composition as set forth in claim 10, further characterized in that the methacrylate polymer is methylmethacrylate-co-ethylacrylate.

16. The fusible sealant composition as set forth in claim 10, further characterized in that the methacrylate polymer is methylmethacrylate-co-butylmethacrylate.

17. A preinsulated electrical connector having a heat recoverable sleeve, the connector comprising a conductor connecting means positioned within the heat recoverable sleeve, the conductor connecting means being designed to receive and electrically connect two or more electrical conducting members, the members being inserted from the ends of the sleeve, and at least one fusible sealant insert member positioned near at least one of the open ends of the sleeve, the connector being characterized in that:

the sealant insert is made of a material comprised of a homogeneous mixture of polyvinylidene fluoride, a methacrylate polymer, and antimony oxide, the polyvinylidene fluoride comprises from about 64 percent to about 93 percent by weight of the mixture, the methacrylate polymer comprises from about 3 percent to about 32 percent by weight of the mixture, the antimony oxide comprises approximately 4 percent by weight of the mixture, whereby, upon application of sufficient heat to the sleeve, the sleeve recovers around the conductor connecting means and the electrical conducting members, and said at least one fusible sealant insert member softens, conforms and adapts to the conducting members, adheres to the conducting members and the sleeve, and seals the interstices between the conducting members and the recovered sleeve.

18. A preinsulated electrical connector as set forth in claim 17, further characterized in that the composition is also comprised of approximately 4 percent by weight of zinc oxide.

19. A preinsulated electrical connector as set forth in claim 18, further characterized in that the methacrylate polymer is one that is miscible with polyvinylidene fluoride and produces a sealant with a melt viscosity of 3,000 to 11,000 poises when measured at 400°–450° F. (204°–232° C.).

20. A preinsulated electrical connector as set forth in claim 18, further characterized in that the methacrylate polymer is methylmethacrylate-co-ethylacrylate.

21. The fusible sealant composition as set forth in claim 3, further characterized in that the methacrylate polymer has a weight average molecular weight in the range of 20,000 to 350,000.

22. The fusible sealant composition as set forth in claim 6, further characterized in that the methacrylate polymer is one that has a weight average molecular weight in the range of 20,000 to 350,000.

23. The fusible sealant composition as set forth in claim 11, further characterized in that the methacrylate polymer is one that has a weight average molecular weight in the range of 20,000 to 350,000.

24. The fusible sealant composition as set forth in claim 14, further characterized in that the methacrylate polymer has a weight average molecular weight in the range of 20,000 to 350,000.

25. A preinsulated electrical connector as set forth in claim 19, further characterized in that the methacrylate polymer has a weight average molecular weight in the range of 20,000 to 350,000.

* * * * *